(12) United States Patent
Lim et al.

(10) Patent No.: US 11,544,408 B2
(45) Date of Patent: Jan. 3, 2023

(54) METHOD AND SYSTEM FOR MANAGING VEHICLE GENERATED DATA

(71) Applicants: Hyundai Motor Company, Seoul (KR); Kia Motors Corporation, Seoul (KR); Hyundai AutoEver Corporation, Seoul (KR)

(72) Inventors: Wha Pyeong Lim, Gyeonggi-do (KR); Seung Wook Park, Gyeonggi-do (KR); Ju Yeon Lim, Seoul (KR); Jeong Gi Gong, Seoul (KR)

(73) Assignees: Hyundai Motor Company, Seoul (KR); Kia Motors Corporation, Seoul (KR); Hyundai Autoever Corporation, Seoul (KR)

( * ) Notice: Subject to any disclaimer, the term of this patent is extended or adjusted under 35 U.S.C. 154(b) by 0 days.

(21) Appl. No.: 17/136,434

(22) Filed: Dec. 29, 2020

(65) Prior Publication Data

US 2021/0232704 A1  Jul. 29, 2021

(30) Foreign Application Priority Data

Jan. 29, 2020  (KR) .................. 10-2020-0010539

(51) Int. Cl.
*G06F 21/00* (2013.01)
*G06F 21/62* (2013.01)
*B60R 25/00* (2013.01)

(52) U.S. Cl.
CPC .......... *G06F 21/6254* (2013.01); *B60R 25/00* (2013.01)

(58) Field of Classification Search
CPC ............... G06F 21/6254; H04L 9/3231; H04L 63/0407; H04L 63/0414; H04L 63/0421; H04L 9/3239
See application file for complete search history.

(56) References Cited

U.S. PATENT DOCUMENTS

| | | | |
|---|---|---|---|
| 2016/0097648 A1* | 4/2016 | Hannah | G08G 1/096741 701/118 |
| 2016/0147945 A1* | 5/2016 | MacCarthy | H04W 12/02 705/51 |
| 2018/0227131 A1* | 8/2018 | Ebrahimi | H04L 9/3263 |
| 2019/0074960 A1* | 3/2019 | Ravi | G06F 21/64 |

FOREIGN PATENT DOCUMENTS

DE   102014005589 A1   9/2014
WO   2015100278 A1   7/2015

OTHER PUBLICATIONS

Petit et al., "Potential Cyberattacks on Automated Vehicles", IEEE Transactions on Intelligent Transportation Systems, vol. 16, Issue: 2, Apr. 2015.*
Petit et al. (2015) "Pseudonym Schemes in Vehicular Networks: A Survey", IEEE Communications Surveys & Tutorials, 17(1):228-255.

* cited by examiner

*Primary Examiner* — Morshed Mehedi
(74) *Attorney, Agent, or Firm* — Fox Rothschild LLP (57) ABSTRACT

A system for collecting and managing vehicle-generated data from multiple vehicles are provided. The vehicle-generated data is pseudonymized by pseudonymized identifiers, and the pseudonymized vehicle-generated data is collected and managed by a neutral data server operated by an operator who is independent of vehicle manufacturers. Vehicle manufacturers can reestablish the link of the pseudonymized event data with the vehicle that had generated the event data and the vehicle driver.

13 Claims, 5 Drawing Sheets

METHOD AND SYSTEM FOR MANAGING VEHICLE GENERATED DATA

CROSS-REFERENCE TO RELATED APPLICATIONS

The present application is based on, and claims priority from, Korean Patent Application Number 10-2020-0010539, filed Jan. 29, 2020, the disclosure of which is incorporated by reference herein in its entirety.

TECHNICAL FIELD

The present disclosure relates to a method and system for collecting and managing data generated by multiple vehicles.

BACKGROUND

The statements in this section merely provide background information related to the present disclosure and do not necessarily constitute prior art. With more vehicles being given the benefit of ADAS (Advanced Driver Assistance Systems) or autonomous driving functions, traffic accidents are becoming more attributed to vehicles than to the drivers. For proper clarification of causes of an accident, there is a growing demand to collect data in addition to the data recorded by the existing Event Data Recorder (EDR), such as additional information regarding the operational status of ADAS or autonomous driving functions, the detailed determination by the vehicle system on the sensor input, etc.

Data generated, recorded, and stored in vehicles, including EDR data may be used for a variety of purposes from vehicle-related services (e.g., insurance, maintenance, used car transactions, rental/sales, etc.) to marketing and research (e.g., traffic analysis, autonomous driving, etc.). For example, vehicle manufacturers, etc., seek to utilize vehicle data to verify and improve the functions of various ECUs, sensors, and other components installed in the vehicle. Further, the insurance industry attempts to introduce the so-called 'Usage Base Insurance (UBI)' to calculate insurance premiums that are suitable for risks due to driver's driving propensity.

With the development of information and communication technology, such vehicle data may be collected in various forms by a data server on a network and provided to various service providers. Some information collected by the data server may be sensitive in terms of personal privacy. Since the operator had real control and sales rights for personal information in these data servers, the individual had to take a lot of risks. Moreover, as legislation on privacy protection, such as the European General Data Protection Regulation (GDPR), has been implemented, companies need to demonstrate the responsibility and consequences for data protection by establishing a process of collecting, processing, updating, storing, and deleting personal data records.

SUMMARY

According to at least one aspect, the present disclosure provides a method of operating a vehicle to process vehicle-generated data. The method may include applying a hash function to a combination of a first salt and personally identifiable information that uniquely identifies a driver to generate a driver pseudonymized identifier, and applying the hash function to a combination of a second salt and a vehicle identification information that uniquely identifies the vehicle to generate a vehicle pseudonymized identifier, and transmitting a salt generation information for a reconstruction of the first salt and the second salt to a vehicle manufacturer server having the personally identifiable information and the vehicle identification information, and transmitting pseudonymized vehicle-generated data identified by the driver pseudonymized identifier and the vehicle pseudonymized identifier to a data server operated by an operator who is independent of a vehicle manufacturer of the vehicle.

The personally identifiable information may be an identification of an individual including at least one of a resident registration number or social security number, a driver's license number, a mobile phone number, or biometric data (e.g., fingerprint information), or a unique identifier assigned to a fob key possessed by the individual in connection with the vehicle, or a user ID of the individual, which is assigned from the vehicle manufacturer server. The vehicle identification information may be a vehicle identification number (VIN), a vehicle registration number, or a unique identifier used by an in-vehicle telecommunication device of the vehicle to communicate with an external network. The vehicle-generated data may be data recorded by an event data recorder (EDR) mounted on the vehicle.

In some exemplary embodiments, the first salt and the second salt are generated by using a pair of seeds selected from an indexed list of seeds shared by the vehicle manufacturer server and the vehicle, and the salt generation information contains an index of the pair of seeds used to generate the first salt and the second salt. In addition, the salt generation information may further include sequence numbers indicating the number of times the first salt is generated using the pair of seeds and the number of times the second salt is generated by using the pair of seeds.

The driver pseudonymized identifier and the vehicle pseudonymized identifier may be generated in response to the driver logging in to the vehicle and succeeding in a driver authentication. The driver pseudonymized identifier and the vehicle pseudonymized identifier may be discarded when a vehicle operation by the driver is terminated. In addition, the driver pseudonymized identifier and the vehicle pseudonymized identifier are consistently used for the driver.

According to another aspect, the present disclosure provides a method performed by a vehicle manufacturer server for obtaining vehicle-generated data associated with a specific driver or a specific vehicle from a data server storing pseudonymized vehicle-generated data collected from a plurality of vehicles. The method may include generating at least one of a first salt or a second salt using a salt generation information received from the specific vehicle, and reconstructing at least one of a driver pseudonymized identifier or a vehicle pseudonymized identifier.

The driver pseudonymized identifier may be reconstructed by applying a hash function to a combination of the first salt and personally identifiable information uniquely identifying the specific driver may be reconstructed, and the vehicle pseudonymized identifier may be reconstructed by applying the hash function to a combination of the second salt and a vehicle identification information uniquely identifying the specific vehicle. The method may further include requesting the data server to provide pseudonymized vehicle-generated data corresponding to at least one reconstructed pseudonymized identifier that is reconstructed from the driver pseudonymized identifier or the vehicle pseudonymized identifier, and receiving the pseudonymized vehicle-generated data corresponding to the at least one reconstructed pseudonymized identifier from the data server.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

REFERENCE NUMERALS

100: system for collecting and managing vehicle-generated data
10: in-vehicle monitoring system
20: vehicle manufacturer (VM) server

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure seeks to present a technique performed by a centralized system that collects and manages vehicle-generated data for managing the vehicle-generated data separately from personal information to offer privacy protection to individuals.

Some exemplary embodiments of the present disclosure are described below with reference to the accompanying drawings. In the following description, like reference numerals designate like elements, although the elements are shown in different drawings. Further, in the following description of some exemplary embodiments, a detailed description of known functions and configurations incorporated herein will be omitted for the purpose of clarity and for brevity.

The present disclosure generally relates to a system for collecting and managing data (i.e., vehicle-generated data) generated, recorded, or stored in a vehicle from a plurality of vehicles. Vehicle-generated data is pseudonymized by pseudonymized identifiers, and the pseudonymized vehicle-generated data is collected and managed by a data server that is neutral and operated by an operator who is independent of vehicle manufacturers. The pseudonymized vehicle-generated data stored in the data server does not contain any meaningful information that enables a third party to identify the vehicle or individual involved and may be freely used without compromising the privacy of the individual. Vehicle manufacturers, under the law or court order, or with the consent of the vehicle owner or driver, may reestablish the link of the pseudonymized event data with the vehicle that had generated the event data and the vehicle owner/driver.

Figure 1:
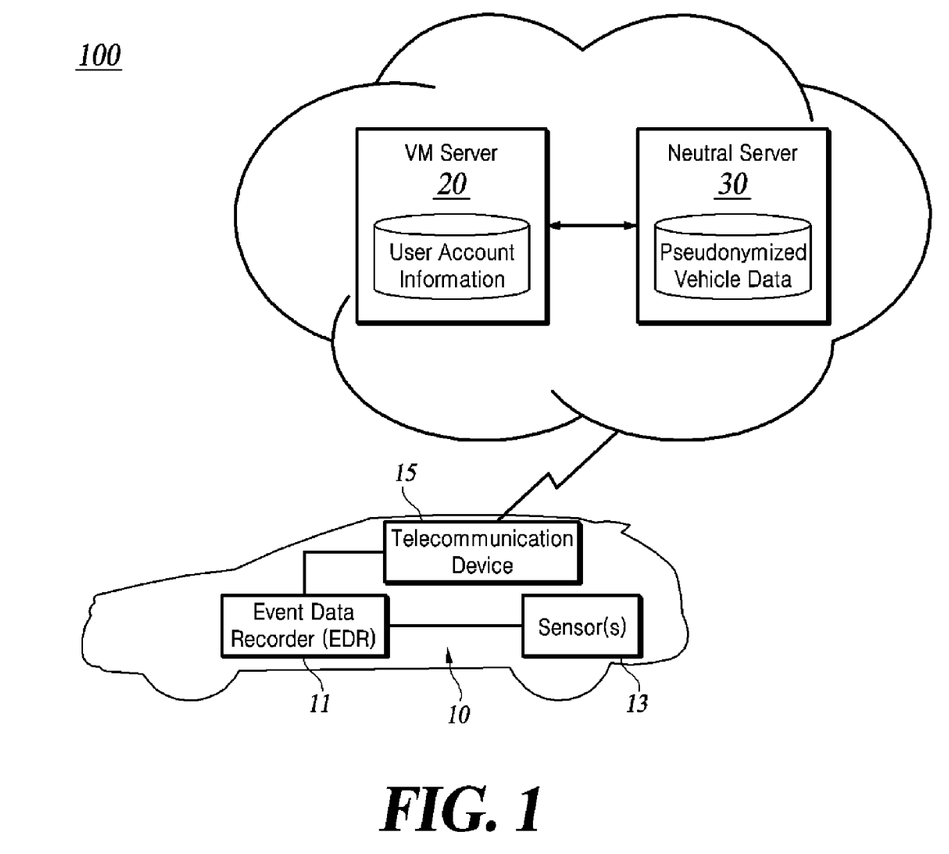
FIG. 1 is a schematic diagram of a centralized system for collecting and managing vehicle-generated data from vehicles according to at least one exemplary embodiment of the present disclosure.

FIG. 1 is a schematic diagram illustrating a centralized system 100 for collecting and managing vehicle-generated data from vehicles according to at least one exemplary embodiment of the present disclosure. The system 100 of FIG. 1 relates to vehicle-generated data illustrated as data recorded by an event data recorder (EDR) provided in a vehicle, although the system 100 as described below is also applicable to other types of data generated, recorded or stored by other types of in-vehicle devices in relation to a vehicle operation or driver behavior. For example, the system 100 of FIG. 1 may be configured to apply to autonomous driving data, e.g., time-stamped data of events such as state transition of ADAS (advanced driver assistance systems) functions, minimal risk maneuver (MRM) initiation, switching of control to the driver, and errors in the autonomous driving system, which is recorded by a recently discussed Data Storage System for Automated Driving Vehicles (DSSAD).

The system 100 may include an in-vehicle monitoring system 10 provided in a vehicle, a vehicle manufacturer (VM) server 20 operated by a vehicle manufacturer, and a data server 30 operated by an operator who is independent of vehicle manufacturers. Although FIG. 1 illustrates one vehicle and one VM server 20, there may be multiple vehicles and multiple VM servers 20 operating in different vehicle manufacturers. The data server 30 may be referred to as a "neutral server" in that it is operated by an operator who is independent of vehicle manufacturers.

The in-vehicle monitoring system 10 may be configured to generate, record, or store various types of data related to vehicle operation or driver behavior. For example, the in-vehicle monitoring system 10 may include an event data recorder (EDR) 11, at least one or more sensors 13, and a telecommunication device 15, which are connected to in-vehicle data buses, e.g., controller area network (CAN), local interconnect network (LIN), medium oriented systems transport (MOST), ethernet, etc.

The EDR 11 may be configured to receive data from various sensors and/or electronic control units (ECUs) mounted on the vehicle. The EDR 11 has volatile memory that has data for a certain period temporarily stored while being continuously updated. The EDR 11 may be responsive to a detection of the occurrence of one or more predefined events for recording the data stored in the volatile memory within a predetermined time before and after the detection in the internal nonvolatile memory, and providing the recorded data to the telecommunication device 15.

Such an event may in particular be a traffic collision. A traffic collision may be detected, for example, when triggering the deployment of an irreversible safety device such as an airbag or seat belt preloading device. A traffic collision may also be detected at the occurrence of acceleration/deceleration exceeding a predefined threshold (e.g., a speed change of 8 km/h or higher within about 150 ms). The predefined event(s) may further include a malfunction of the main function of the vehicle.

The event data recorder 11 may be configured to receive trigger signal(s) informing of the occurrence of an event from the electronic control unit(s), such as, for example, an airbag control unit (ACU). The event data recorder 11 may be accessible to values measured by at least one or more sensors 13. At least one sensor 13 may be configured to detect vehicle speed/acceleration/deceleration/travel distance, and the like. The data recorded by the event data recorder 11 may be data suitable for analyzing traffic collisions, such as, for example, data of vehicle dynamics, driver's behavior, and an operating state of a vehicle safety system. The event data recorder 11 may be configured to transmit recorded data (hereinafter referred to as 'EDR data') to the telecommunication device 15.

The telecommunication device 15 is responsive to EDR data received from the event data recorder 11 for obtaining additional information such as the date, time, and geographical location of the event from a location determination or positioning device (not shown), time determining device (not shown), etc. The positioning device may include a receiver configured to receive geographical location information and/or time information from a satellite-assisted positioning system such as GPS and GNSS. The telecommunication device 15 may include a location determination device and/or a time determination device. Alternatively, the EDR data recorded by the event data recorder 11 may include the date, time (i.e., timestamp), and geographical location of the event.

The telecommunication device 15 may be a wired or wireless communication device that connects the vehicle's internal network to an external communication network. The telecommunication device 15 may be, for example, a telematics unit (TMU) or a wired/wireless dongle plugged into an OBD-II port. The telecommunication device 15 may include a wireless transceiver capable of cellular communication such as GSM/WCDMA/LTE/5G or short-range wireless communication such as WLAN, c-V2X, WAVE, DSRC, Bluetooth, for example.

The telecommunication device 15 may be configured to generate an event report message. The event report message may include event data (EDR data and additional information), a driver's pseudonymized identifier, and a vehicle pseudonymized identifier. The telecommunication device 15 may be configured to transmit the event report message to the neutral server 30 via the communication network. In addition, the telecommunication device 15 may be configured to transmit information necessary for generating pseudonymized identifiers ('SALT generation information' to be described below) to the VM server 20 and thus, the VM server 20 may be configured to directly generate pseudonymized identifiers later. Alternatively, the telecommunication device 15 may be configured to transmit the pseudonymized identifiers themselves to the VM server 20.

As will be described below, these pseudonymized identifiers themselves do not include any meaningful information for identifying the vehicle or individual. In addition, the event report message is merely distinguished from the event report messages of other vehicles by the pseudonymized identifiers but does not include any meaningful information for identifying the vehicle or the individual other than the pseudonymized identifiers. Therefore, the event report message contains "pseudonymized" event data.

The neutral server 30 may be configured to receive event report messages from multiple vehicles. The neutral server 30 associates the event data with pseudonymized identifiers and stores the associated data in the vehicle data storage. The neutral server 30 may provide service users with "pseudonymized" event data. The service users may be vehicle owners, drivers, insurance companies, government agencies, researchers, vehicle manufacturers, the VM server 20, etc. who wish to utilize event data.

Individuals or institutions may subscribe as a user to the VM server 20, and register the vehicle(s) they own or operate. The VM server 20 may be configured to manage a user account storage for recording user account information. In response to receiving information necessary for generating pseudonymized identifiers ('SALT generation information' to be described below) from the vehicle, the VM server

20 may be configured to add the 'SALT generation information' to the user account information of the individual or institution who owns or operates that vehicle.

The VM server 20 may utilize the user account information for regenerating (or reconfiguring) the driver's pseudonymized identifier and the vehicle pseudonymized identifier for a specific individual and/or a specific vehicle. Accordingly, the VM server 20 may be configured to reestablish the link of the pseudonymized event data stored in the neutral server 30 with the vehicle that had generated the event data and the vehicle owner/driver.

When event data of a specific individual and/or a specific vehicle is required, the VM server 20 may be configured to generate and provide the relevant driver's pseudonymized identifier and/or vehicle pseudonymized identifier to the neutral server 30 to receive related event data from the neutral server 30. To protect the privacy of individuals, event data relating to such specific individual or a specific vehicle needs to be exclusively accessed by persons or organizations authorized by the vehicle owner, unless otherwise authorized by court order, search warrant, and/or other applicable laws and regulations.

As described above, according to the present disclosure, in the VM server 20 and the neutral server 30 operated by operators who are independent of each other, pseudonymized event data and information that may generate pseudonymized identifiers are stored separately from each other. As described above, the vehicle-generated data management system 100 of FIG. 1 may be configured to apply event data, and also to other types of vehicle-generated data generated, recorded, or stored in other types of devices than the EDR in the vehicle in relation to vehicle operation or driver behavior. In some exemplary embodiments, vehicle-generated data may be periodically transmitted to the neutral server 30.

Figure 2A:
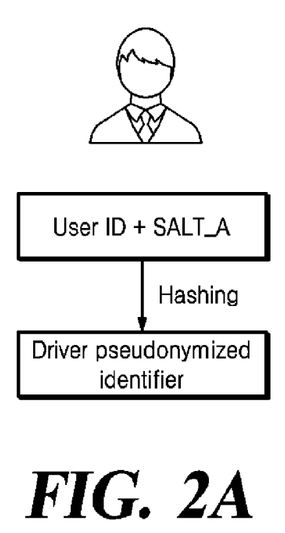
FIGS. 2A-2B are schematic diagrams of the principle of generating a driver pseudonymized identifier and a vehicle pseudonymized identifier in at least on exemplary e embodiment of the present disclosure.
Figure 2B:
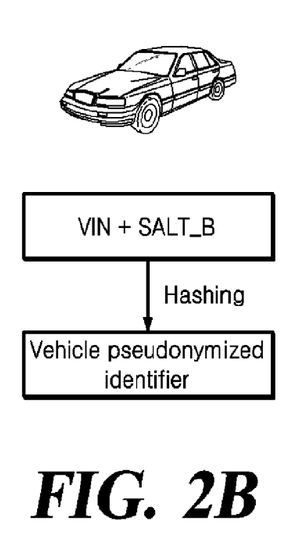

FIGS. 2A-2B are schematic diagrams of the principle of generating a driver pseudonymized identifier and a vehicle pseudonymized identifier in at least one exemplary embodiment of the present disclosure. The driver pseudonymized identifier may be generated by applying a cryptographic hash function to a combination of personally identifiable information (PII) that uniquely identifies an individual, i.e., the owner or driver of the vehicle and a salt that is a random string. The PII, or personally identifiable information may be, for example, an individual's resident registration number or social security number, a driver's license number, a mobile phone number, a unique identifier assigned to an individual's fob key associated with the vehicle, or an individual's assigned user ID from the VM server 20. FIG. 2A illustrates an exemplary method of generating a driver pseudonymized identifier by applying a hash function to a concatenation of a user ID and SALT_A.

Similarly, the vehicle pseudonymized identifier may be generated by applying a cryptographic hash function to a combination of vehicle identification information and a salt. The vehicle identification information may be, for example, information that may be collected from in-vehicle ECUs, including a vehicle identification number (VIN), a vehicle registration number, or a unique identifier that the telecommunication device 15 uses for communications. FIG. 2B illustrates an exemplary method of generating a vehicle pseudonymized identifier by applying a hash function to a concatenation of a vehicle identification number (VIN) and SALT_B.

The cryptographic hash function makes it impossible to extract personally identifiable information, vehicle identification information, or other useful information that allows tracking the identity of the vehicle or individual from the generated pseudonymized identifier. For the hash function, SHA256, SHA512, RipeMD, WHIRLPOOL, etc. may be used. In particular, the cryptographic hash function has been described as an example, but other types of cryptographic algorithms that generate pseudonymized identifiers may be used.

A salt may be generated in whole or in part using a pseudo random number generator (PRNG). The PRNG may use a deterministic algorithm that receives a seed and generates an output bitstream. The length of the portion randomly generated in the salt may be equal to or greater than the output of the hash function. For example, the output of SHA256 is 256 bits (32 bytes), so the salt (SALT_A, SALT_B) needs to be at least 32 bytes.

As described above, the vehicle may be configured to transmit information necessary for generating pseudonymized identifiers to the VM server 20 so that the latter may be configured to generate pseudonymized identifiers later. The anonymity of the pseudonymized identifier may be affected by the security strength of the salt, so transmitting the salt or the seed itself to the VM server 20 may weaken the anonymity of the pseudonymized identifier due to the risk of being exposed to an attacker during transmission. To reduce the risk of salt exposure, it may be preferable to use a more secure method, instead of transmitting the salt or seed to the VM server 20.

Figure 3:
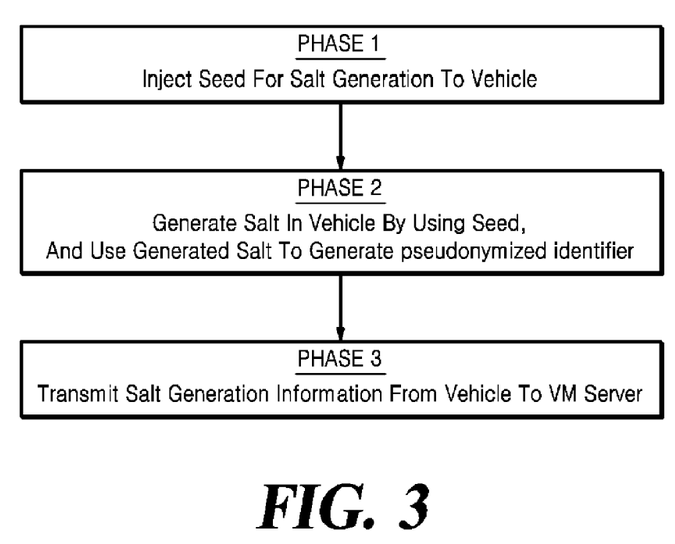
FIG. 3 is a diagram of a salt generation method considering salt security strength and a method of providing salt generation information to a VM server according to at least one exemplary embodiment of the present disclosure.

FIG. 3 is a diagram of a salt generation method considering salt security strength and a method of providing salt generation information to a VM server according to at least one exemplary embodiment of the present disclosure.

PHASE 1: The vehicle manufacturer may inject a number of seeds at the time of manufacture of the vehicle into a hardware security module (HSM) provided in the vehicle. Alternatively, after the vehicle is sold, a number of seeds may be injected into the vehicle's HSM through an authorized service center. Furthermore, seeds in the HSM may be updated from the VM server 20 via over-the-air (OTA) updating. The number of seeds injected may be determined based on the life or maintenance cycle of the vehicle. Multiple seeds may be indexed in the form of a look-up table and stored in a security storage of the HSM. A pair of seeds in the seed list may be identified by one index. A pair of seeds may be used as seeds for generating a driver pseudonymized identifier and a vehicle pseudonymized identifier, respectively. The seed list injected into each vehicle may be managed by the database of the VM server 20 for synchronization. The HSM may be provided in the telecommunication device 15 or provided in an electronic control unit for generating/recording/storing vehicle-generated data, such as EDR 11 or DSSAD, or another electronic control unit within the vehicle.

PHASE 2: When the in-vehicle monitoring system 10 delivers personally identifiable information (e.g., user ID) or vehicle identification information (e.g., VIN) to the HSM, the HSM may be configured to generate a salt by inputting a seed selected from the pre-stored seed list to the pseudo-random number generator (PRNG), and generate a hash value, i.e., a driver's pseudonymized identifier or a vehicle pseudonymized identifier by applying a hash function to the combination of the generated salt and the personally identifiable information or vehicle identification information. The HSM may be configured to deliver, along with the generated pseudonymized identifier, the index number of the seed used for the generation, and its sequence number to the in-vehicle monitoring system 10. The sequence number may indicate the number of times the HSM has performed the salt (or identifier) generation process. A new seed may be used each time salt is generated, or one seed may be used a certain number of times until it is discarded for the next seed to be used. The sequence number may be used to count the number of times the current seed was used to generate the salt.

PHASE 3: The telecommunication device 15 of the in-vehicle monitoring system 10 may be configured to transmit the index number and sequence number of the seed used to generate the salt to the VM server 20, as salt generation information. Accordingly, the present disclosure may reduce the risk of leakage that may occur with the salt itself when transmitted to the VM server 20 via the communication network. In addition, by sharing the sequence number, the OEM server and the vehicle's client may more accurately synchronize with each other to discard and use the seed. The sequence number may also be used to check whether omission has occurred in the transmission of these data.

Figure 4:
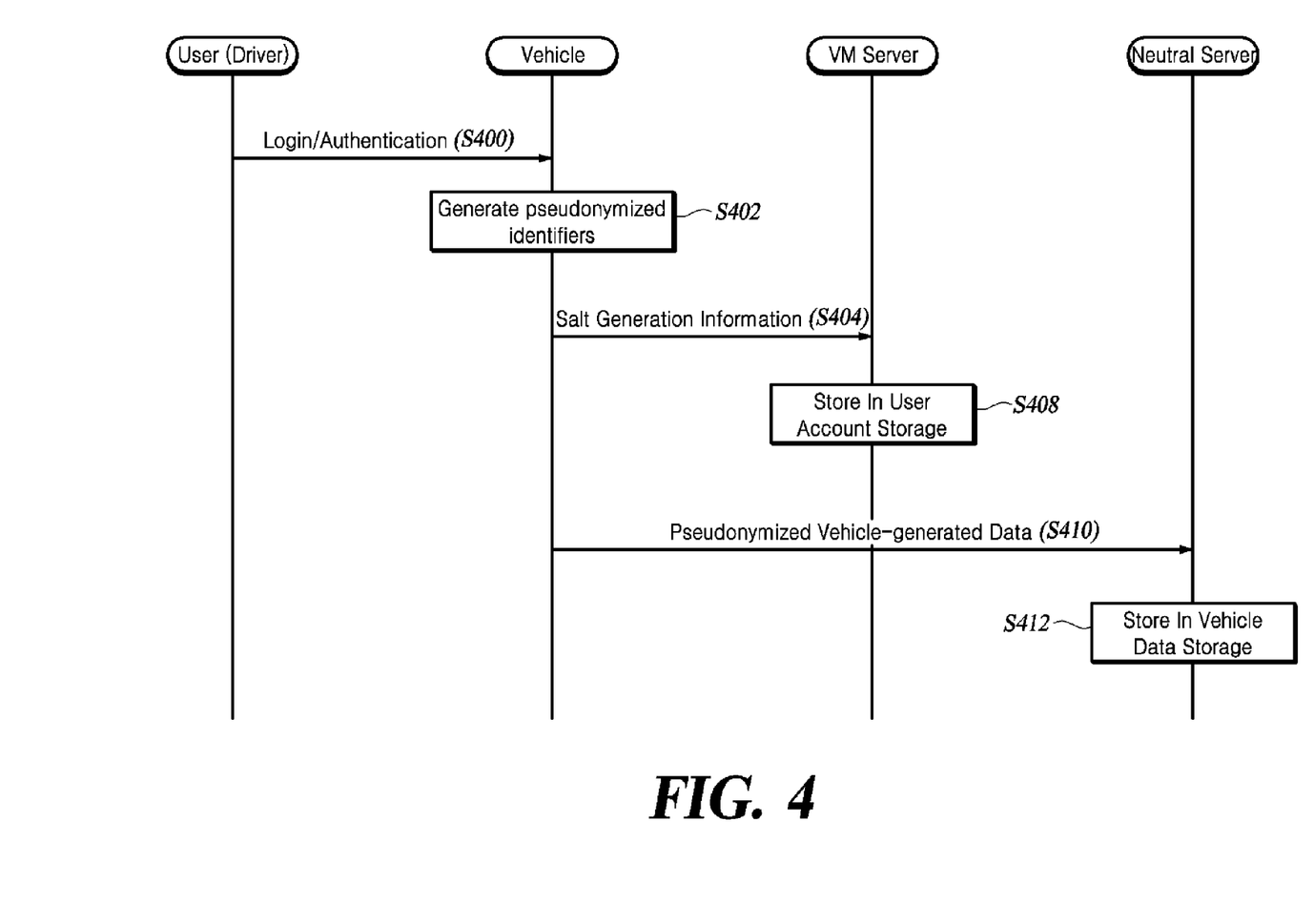
FIG. 4 is a flow chart of a process of collecting and storing vehicle-generated data, which is performed by the system of FIG. 1 according to at least one exemplary embodiment of the present disclosure.

FIG. 4 is a flow chart of a process of collecting and storing vehicle-generated data, which is performed by the system of FIG. 1 according to at least one exemplary embodiment of the present disclosure. When the user logs in to the in-vehicle monitoring system 10 and succeeds in driver authentication (S400), the in-vehicle monitoring system 10 may be configured to generate a driver pseudonymized identifier and a vehicle pseudonymized identifier corresponding to the user (S402). The user's login and authentication may be performed using a fob key possessed by the user or based on biometric authentication. The in-vehicle monitoring system 10 may be configured to store the generated pair of pseudonymized identifiers internally and transmit to the VM server 20, the salt generation information including the seed index number and sequence number used in the process of generating the pseudonymized identifiers. (S404).

The VM server 20 may be configured to store the received salt generation information in the user account storage (S408). The stored salt generation information may be used later by the VM server 20 for regenerating the driver pseudonymized identifier and the vehicle pseudonymized identifier. The in-vehicle monitoring system 10 may be configured to transmit vehicle-generated data identified by the driver pseudonymized identifier and the vehicle pseudonymized identifier (i.e., pseudonymized vehicle-generated data) to the neutral server 30 (S410). The neutral server 30 may be configured to store the pseudonymized vehicle-generated data in the vehicle data storage (S412).

In a typical exemplary embodiment, the in-vehicle monitoring system 10 may be configured to generate a new pair of pseudonymized identifiers each time a user logs in/authenticates. Therefore, the pair of pseudonymized identifiers may be discarded when the vehicle operation is terminated and the user logs out. In another exemplary embodiment, the in-vehicle monitoring system 10 is responsive to a second login/authentication by a user who previously logged in/authenticated for reusing a pair of pseudonymized identifiers (e.g., driver pseudonymized identifier and vehicle pseudonymized identifier) previously generated for the same user. Accordingly, the pair of pseudonymized identifiers once generated may be permanently stored in the vehicle unless the user's account is deleted. In yet another exemplary embodiment, the in-vehicle monitoring system 10 may use new pseudonymized identifiers each time the vehicle-generated data is transmitted to neutral server 30. Accordingly, the in-vehicle monitoring system 10 may be configured to discard the existing pseudonymized identifiers and generate new pseudonymized identifiers upon completion of the transmission of the vehicle-generated data.

Figure 5A:
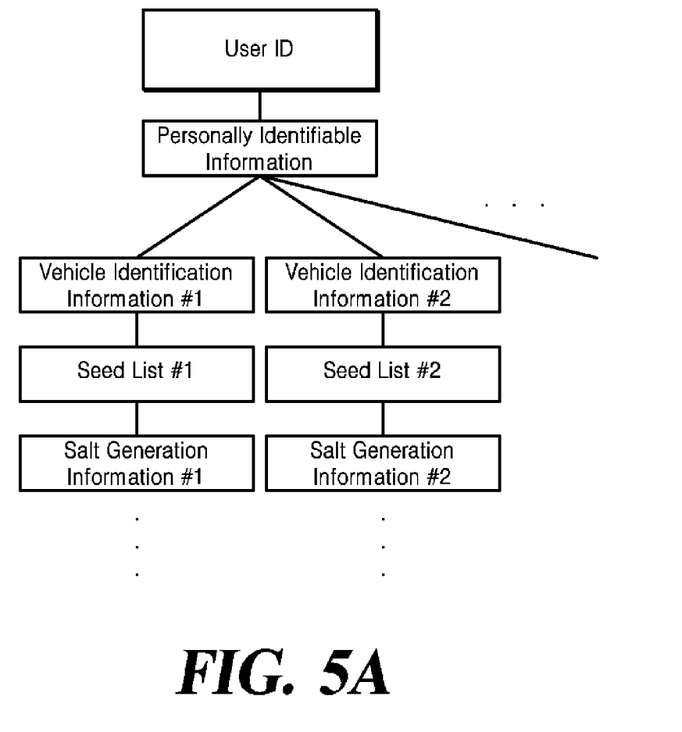
FIG. 5A is a diagram of an exemplary structure of user account information managed by the VM server according to at least one exemplary embodiment of the present disclosure.
Figure 5B:
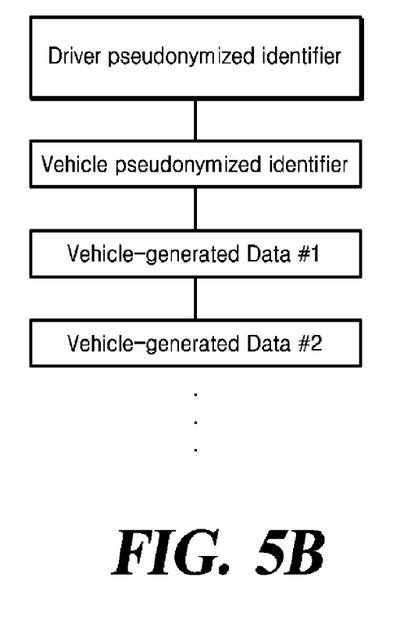
FIG. 5B is a diagram of an exemplary structure of pseudonymized vehicle-generated data managed by a neutral server according to at least one exemplary embodiment of the present disclosure.

FIG. 5A is a diagram of an exemplary structure of user account information managed by the VM server 20, and FIG. 5B is a diagram of an exemplary structure of pseudonymized vehicle-generated data managed by the neutral server 30. A single vehicle driver may use multiple vehicles, and a single vehicle may be used by multiple drivers. Therefore, the driver(s) and the vehicle(s) may have a 1:N relationship or an N:1 relationship.

As shown in FIG. 5A, the user account information may include user ID, personally identifiable information, vehicle identification information of the vehicle(s) owned or operated by the user, a plurality of indexed seeds (i.e., seed list) that were injected into the vehicle, salt generation information, and the like. In the example of FIG. 5A, the user account information may be configured in a 1:N relationship between the user(s) and the vehicle(s). In addition, since the pseudonymized identifiers may be generated in each vehicle multiple times, a plurality of salt generation information may be linked to each single vehicle identification information in the user account information.

As shown in FIG. 5B, the pseudonymized vehicle-generated data in the vehicle data storage may be identified by a pair of pseudonymized identifiers, so the driver pseudonymized identifier and the vehicle pseudonymized identifier are configured in a 1:1 relationship in the pseudonymized vehicle-generated data. Additionally, to the pair of pseudonymized identifiers, a plurality of vehicle-generated data may be linked.

Figure 6:
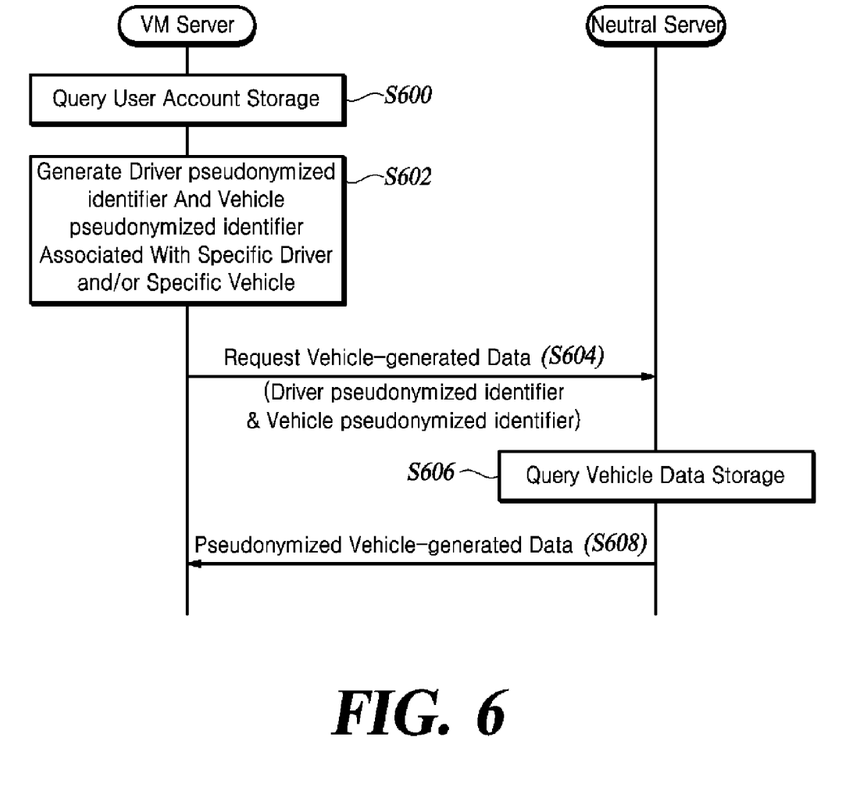
FIG. 6 is a flow chart of a process performed by the system of FIG. 1 in which the VM server obtains vehicle-generated data related to a specific driver and/or a specific vehicle according to at least one exemplary embodiment of the present disclosure.

FIG. 6 is a flow chart of a process performed by the system of FIG. 1 in which the VM server 20 obtains vehicle-generated data related to a specific driver and/or a specific vehicle. The VM server 20 may be configured to receive, for example, a request for vehicle-generated data related to a specific driver and/or a specific vehicle from a vehicle owner, an insurance company, or an investigator of an investigation agency. The VM server 20 may be configured to first determine whether the requestor is an authorized person by court order, search warrant, and/or other applicable laws and regulations or by the relevant vehicle owner. The VM server 20 may be configured to obtain personally identifiable information (PII), vehicle identification information (VII), a seed list, and salt generation information related to the driver and/or vehicle under request from the user account storage (S600).

The VM server 20 may be configured to identify a pair of seeds in the seed list based on salt generation information, i.e., an index of a pair of seeds received from the vehicle, and may use the identified pair of seeds to generate SALT_A and SALT_B. The VM server 20 may be configured to apply a hash algorithm to the personally identifiable information and SALT_A to generate a driver pseudonymized identifier and apply the hash algorithm to the vehicle identification information and SALT_B to generate a vehicle pseudonymized identifier (S602). The VM server 20 may be configured to transmit a request message for requesting vehicle-generated data including a driver pseudonymized identifier and a vehicle pseudonymized identifier to the neutral server 30 (S604).

The neutral server 30 may be configured to query the database to obtain vehicle-generated data corresponding to the driver's pseudonymized identifier and the vehicle pseudonymized identifier (S606) and transmit the obtained vehicle-generated data to the VM server 20 (S608). The VM server 20 may be configured to transmit the received vehicle-generated data to the requester. In the example of FIG. 6, a pair of pseudonymized identifiers has been generated and used for the VM server 20 to request vehicle-generated data from the neutral server 30, but it should be noted that of a pair of pseudonymized identifiers, either a driver pseudonymized identifier or a vehicle pseudonymized identifier may be generated and used for the same purpose.

It should be understood that the above-described exemplary embodiments can be implemented in many different ways. In some examples, the various devices described in this disclosure may be implemented as an application-specific integrated circuit (ASIC), digital signal processor (DSP), programmable logic device (PLD), field-programmable gate array (FPGA), processor, controller, microprocessor, other electronic units or a combination thereof. In some examples, the various methods, servers, (sub-)systems described in this disclosure may be implemented by at least one general-purpose computer having a processor, memory, disk, or other mass storage, communication interface, input/output (I/O) devices, and other peripherals. A general-purpose computer can function as an apparatus, server, system, etc. that performs the above-described methods by loading software instructions into a processor and then executing instructions to perform the functions described in this disclosure.

Meanwhile, various methods or functions described in the present disclosure may be implemented with instructions stored in a non-transitory recording medium, which can be read and executed by one or more processors. Non-transitory recording media include, for example, all types of recording devices in which data is stored in a form readable by a computer system. For example, non-transitory recording media include storage media such as erasable programmable read-only memory (EPROM), electrically erasable programmable read-only memory (EPROM), flash drives, optical drives, magnetic hard drives, and solid-state drives (SSDs).

According to at least one aspect of the present disclosure, event data recorded in each vehicle is stored and managed in a neutral data server operated by an operator who is independent of vehicle manufacturers. Personal privacy protection is achieved by transmitting vehicle-generated data that is pseudonymized with pseudonymized identifiers to a neutral data server and managing on the vehicle manufacturer's server, data that enables identification or tracking of the vehicle or individual concerned.

The pseudonymized vehicle-generated data stored in the neutral server may be freely used for research purposes, and the vehicle manufacturers may reestablish the link of the pseudonymized event data with the vehicle that had generated the event data and the owner/driver of the vehicle, under the law or court order, or with the consent of the vehicle owner or driver.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. A method of operating a vehicle to process vehicle-generated data, comprising:
    applying, by a controller of a vehicle, a hash function to a combination of a first salt and a personally identifiable information that uniquely identifies a driver to generate a driver pseudonymized identifier,
    applying, by the controller, the hash function to a combination of a second salt and a vehicle identification information that uniquely identifies the vehicle to generate a vehicle pseudonymized identifier;
    transmitting, by the controller, a salt generation information for a reconstruction of the first salt and the second salt to a vehicle manufacturer server having the personally identifiable information and the vehicle identification information; and
    transmitting, by the controller, pseudonymized vehicle-generated data identified by the driver pseudonymized identifier and the vehicle pseudonymized identifier to a data server different from the vehicle manufacturer server.

2. The method of claim 1, wherein
    the first salt and the second salt are generated using at least one seed selected from an indexed list of seeds shared by the vehicle manufacturer server and the vehicle, and
    the salt generation information contains an index of the at least one seed used to generate the first salt and the second salt.

3. The method of claim 1, wherein the transmitting of the salt generation information includes:
    transmitting, by the controller, to the vehicle manufacturer server, sequence numbers indicating a number of times the driver pseudonymized identifier is generated and a number of times the vehicle pseudonymized identifier is generated.

4. The method of claim 1, wherein the driver pseudonymized identifier and the vehicle pseudonymized identifier are generated in response to the driver logging in to the vehicle and succeeding in a driver authentication.

5. The method of claim 1, wherein the driver pseudonymized identifier and the vehicle pseudonymized identifier are discarded when a vehicle operation by the driver is terminated.

6. The method of claim 1, wherein the personally identifiable information includes:
    an identification of the driver including at least one of a resident registration number or social security number, a driver's license number, a mobile phone number, or biometric data, or a unique identifier assigned to a fob key possessed by the driver in connection with the vehicle, or a user ID of the driver, which is assigned from the vehicle manufacturer server.

7. The method of claim 1, wherein the vehicle identification information includes:
    a vehicle identification number (VIN), a vehicle registration number, or a unique identifier used by an in-vehicle telecommunication device of the vehicle to communicate with an external network.

8. The method of claim 1, wherein the vehicle-generated data includes:
    data recorded by an event data recorder (EDR) mounted on the vehicle.

9. The method of claim 1, wherein the vehicle-generated data includes:
    autonomous driving data recorded by a data storage system mounted on the vehicle.

10. A method performed by a vehicle manufacturer server for obtaining vehicle-generated data associated with a specific driver or a specific vehicle from a data server storing pseudonymized vehicle-generated data collected from a plurality of vehicles, the pseudonymized vehicle-generated data in the data server being identified by a vehicle pseudonym identifier and a driver pseudonym identifier which are generated in an associated vehicle, the method comprising:

generating, by a controller, at least one of a first salt or a second salt using a salt generation information received from the specific vehicle;

reconstructing, by the controller, at least one of a driver pseudonymized identifier for the specific driver or a vehicle pseudonymized identifier the for the specific vehicle, wherein the driver pseudonymized identifier is reconstructed by applying a hash function to a combination of the first salt and a personally identifiable information uniquely identifying the specific driver is reconstructed, and the vehicle pseudonymized identifier is reconstructed by applying the hash function to a combination of the second salt and a vehicle identification information uniquely identifying the specific vehicle;

requesting, by the controller, the data server to provide pseudonymized vehicle-generated data corresponding to at least one of the reconstructed driver pseudonymized identifier or the reconstructed vehicle pseudonymized identifier; and receiving, by the controller, the pseudonymized vehicle-generated data corresponding to the at least one of the reconstructed driver pseudonymized identifier or the reconstructed vehicle pseudonymized identifier from the data server.

11. The method of claim 10, wherein the salt generation information contains an index of a pair of seeds, the index identifying the pair of seeds in an indexed list of seeds shared between the vehicle manufacturer server and the specific vehicle, and the first salt and the second salt are bitstrings randomly generated by using the pair of seeds.

12. The method of claim 10, wherein the vehicle-generated data includes:

data recorded by an event data recorder (EDR) mounted on the specific vehicle.

13. The method of claim 10, wherein the vehicle-generated data includes:

autonomous driving data recorded by a data storage system mounted on the specific vehicle.

* * * * *